US009611846B2

(12) United States Patent
Underwood

(10) Patent No.: US 9,611,846 B2
(45) Date of Patent: Apr. 4, 2017

(54) FLOW RESTRICTOR FOR A MUD MOTOR

(71) Applicant: SMITH INTERNATIONAL, INC., Houston, TX (US)

(72) Inventor: Lance D. Underwood, Morrison, CO (US)

(73) Assignee: SMITH INTERNATIONAL, INC., Houston, TX (US)

( * ) Notice: Subject to any disclaimer, the term of this patent is extended or adjusted under 35 U.S.C. 154(b) by 0 days.

(21) Appl. No.: 14/975,680

(22) Filed: Dec. 18, 2015

(65) Prior Publication Data

US 2016/0186748 A1 Jun. 30, 2016

Related U.S. Application Data

(60) Provisional application No. 62/099,087, filed on Dec. 31, 2014.

(51) Int. Cl.

| F16C 33/74 | (2006.01) |
|---|---|
| F01D 25/16 | (2006.01) |
| F04C 2/107 | (2006.01) |
| E21B 4/02 | (2006.01) |
| F16C 17/26 | (2006.01) |
| F04C 15/00 | (2006.01) |
| B23Q 1/28 | (2006.01) |

(Continued)

(52) U.S. Cl.
CPC .............. *F04C 2/1071* (2013.01); *E21B 4/02* (2013.01); *F04C 15/0073* (2013.01); *B23Q 1/265* (2013.01); *B23Q 1/282* (2013.01); *F01D 25/166* (2013.01); *F16C 17/26* (2013.01); *F16C 33/743* (2013.01); *F16C 35/02* (2013.01)

(58) Field of Classification Search
CPC ...... F16C 33/108; F16C 33/24; F16C 33/743; F16C 35/02; F16C 35/07; F16C 17/26; F16F 35/042; F01D 25/16; B23Q 1/262; B23Q 1/265; B23Q 1/282
USPC ..... 384/91, 95, 99, 129, 262–265, 280, 282, 384/290, 428, 483, 275; 418/48, 57, 418/64–65, 68, 208, 210
See application file for complete search history.

(56) References Cited

U.S. PATENT DOCUMENTS

| 3,936,247 A | 2/1976 | Tschirky et al. |
|---|---|---|
| 3,982,859 A | 9/1976 | Tschirky et al. |

(Continued)

FOREIGN PATENT DOCUMENTS

| CN | 200955550 Y | * 10/2007 | .............. F16C 33/10 |
|---|---|---|---|
| CN | 201963718 U | * 9/2011 | .............. F16C 17/12 |

(Continued)

*Primary Examiner* — Marcus Charles

(57) ABSTRACT

An assembly to restrict fluid flow through the bearing section of a positive displacement or progressive cavity pump or motor. The assembly fits within the bearing chamber and includes an upper ring member, a lower ring member, an outer ring member and a floating member. The floating ring member is axially disposed between the upper and lower ring members. The floating ring member is also disposed at least partially around a drive shaft and is radially movable and constrained inwardly of the outer ring member. The floating ring member has a radial clearance between the drive shaft and a floating ring member inner surface with the radial clearance varying depending on the relative position of the floating ring member to the outer ring member.

10 Claims, 2 Drawing Sheets

(51) Int. Cl.
*B23Q 1/26* (2006.01)
*F16C 35/02* (2006.01)

(56) References Cited

U.S. PATENT DOCUMENTS

| | | | | |
|---|---|---|---|---|
| 4,109,502 A | * | 8/1978 | Schaffer | B21D 22/283 |
| | | | | 72/349 |
| 4,220,380 A | | 9/1980 | Crase et al. | |
| 4,744,721 A | * | 5/1988 | Villeneuve | F04D 29/128 |
| | | | | 277/350 |
| 5,215,384 A | * | 6/1993 | Maier | F16C 27/02 |
| | | | | 384/117 |
| 5,351,766 A | | 10/1994 | Wenzel et al. | |
| 6,202,762 B1 | | 3/2001 | Fehr et al. | |
| 6,692,006 B2 | * | 2/2004 | Holder | F16J 15/442 |
| | | | | 277/346 |
| 7,857,320 B1 | * | 12/2010 | Chang | F16J 15/3456 |
| | | | | 277/389 |
| 2003/0185715 A1 | * | 10/2003 | Krivts | H01L 21/67126 |
| | | | | 118/730 |
| 2004/0184942 A1 | * | 9/2004 | Phillips | F04C 2/086 |
| | | | | 418/171 |
| 2009/0110572 A1 | * | 4/2009 | Meacham | F02C 6/12 |
| | | | | 417/406 |
| 2013/0206497 A1 | * | 8/2013 | Fuechsel | B62D 5/0409 |
| | | | | 180/444 |
| 2013/0243635 A1 | * | 9/2013 | Watanabe | F04C 18/0215 |
| | | | | 418/55.1 |

FOREIGN PATENT DOCUMENTS

| | | |
|---|---|---|
| JP | 57103975 A * | 6/1982 |
| JP | 2007321852 A * | 12/2007 |

* cited by examiner

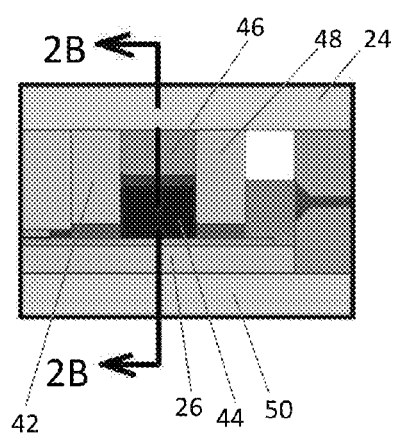
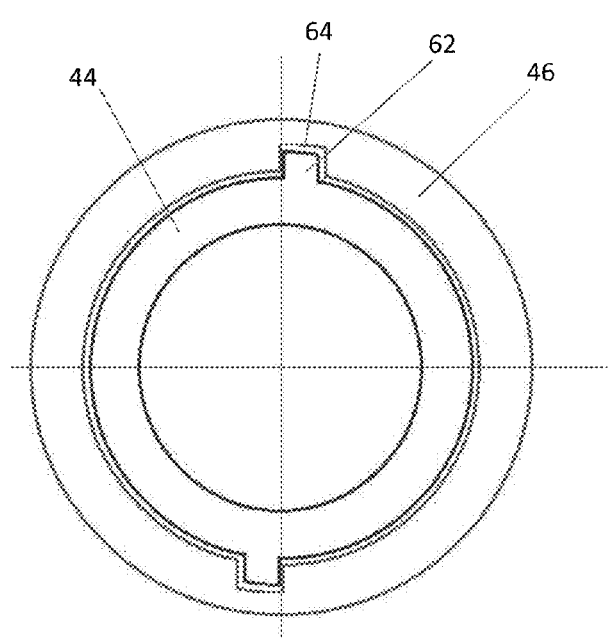
Figure 2A
Figure 2B

FLOW RESTRICTOR FOR A MUD MOTOR

CROSS-REFERENCE TO RELATED APPLICATIONS

The present application claims the benefit of, and priority to, U.S. Provisional Patent Application No. 62/099,087, filed Dec. 31, 2014, which is hereby incorporated by reference in its entirety.

BACKGROUND

One or more implementations described herein generally relate to Moineau-type pumps and motors inclusive of positive displacement or progressive cavity motors and pumps. Such implementations that may be used when drilling the wellbore of a subterranean well. More particularly, one or more such implementations may incorporate a flow restrictor arranged and designed to limit bypass flow through the bearings or bearing section of Moineau-type pumps and/or motors.

Wellbores are frequently drilled into the Earth's formation to recover deposits of hydrocarbons and other desirable materials trapped beneath the Earth's surface. A well may be drilled using a drill bit coupled to the lower end portion of what is known in the art as a drill string. The drill string has a plurality of joints of drill pipe that are coupled together end-to-end using threaded connections. The drill string is rotated by a rotary table or top drive at the surface, which may also rotate the coupled drill bit downhole. Drilling fluid or mud is pumped down through the bore of the drill string and exits through ports at or near the drill bit. The drilling fluid serves to both lubricate and cool the drill bit during drilling operations. The drilling fluid also returns cuttings to the surface via the annulus between the drill string and the side wall of the wellbore. At the surface, the drilling fluid is filtered to remove the cuttings.

A bottom hole assembly (BHA) is often disposed in drilling string toward the lower end portion thereof. The BHA is a collection of drilling tools and measurement devices and may include the drill bit, any directional or formation measurement tools, deviated drilling mechanisms, mud motors (e.g., Moineau pumps/motors) and weight collars. A measurement while drilling (MWD) or logging while drilling (LWD) collar is often positioned just above the drill bit to take measurements relating to the properties of the formation as the wellbore is being drilled. Measurements recorded from MWD and LWD systems may be transmitted to the surface in real-time using a variety of methods known to those skilled in the art. Once received, these measurements assist operators at the surface in making decisions relating to the drilling operation.

Directional drilling is the intentional deviation of the wellbore from the path that it would naturally take. In other words, directional drilling is the steering of the drill string so that the drill string travels in the desired direction. Directional drilling can be advantageous in offshore drilling because directional drilling permits several wellbores to be drilled from a single offshore drilling platform. Directional drilling also enables horizontal drilling through the formation, which permits a longer length of the wellbore to traverse the reservoir and may permit increased hydrocarbon production. Directional drilling may also be beneficial in drilling vertical wellbores. Often, the drill bit will veer off of an intended drilling trajectory due to the sometimes unpredictable nature of the underground formation and/or the forces the drill bit experiences. When such deviation occurs, a directional drilling system may be employed to return the drill bit to its intended drilling trajectory.

A common directional drilling system and its method of use employ a BHA that includes a bent housing and a Moineau motor/pump, which is also known as a positive displacement motor (PDM) or mud motor. The bent housing includes an upper section and lower section formed on the same section of drill pipe, but the respective sections are separated by a bend in the pipe. The bent housing with the drill bit coupled thereto is pointed in the desired drilling direction. The mud motor is employed to rotate the bent housing and thereby rotate the drill bit to drill in the desired direction.

A mud motor converts some of the energy from the flow of drilling fluid or mud downward through the bore of the drill string into a rotational motion that drives the drill bit. Thus, by maintaining the bent housing at the same azimuth relative to the borehole, the drill bit will drill in a desired direction. When straight drilling is desired, the entire drill string, including the bent housing, is rotated from the surface by the rotary table or top drive, as previously described. The drill bit may angulate with the bent housing and therefore may drill a slight overbore, but straight, wellbore.

PDM power sections include a rotor and a stator. The stator may be a metal tube, e.g., steel, with a rubber or elastomer molded and disposed to an inner surface thereof to form a multi-lobed, helixed interior profile. The stator tube may be cylindrical inside (having a rubber or elastomer insert of varying thickness), or may have a similar multi-lobed, helixed interior profile disposed therein so that the molded-in rubber/elastomer is of a substantially uniform thickness (i.e., even wall). Whether solid rubber/elastomer or even wall, power sections are generally uniform throughout their length. That is, they are either all rubber/elastomer or all even wall over the entire length of the multi-lobed, helixed interior profile. The rotor may also be constructed of a metal, such as steel, with a solid or hollow inner construction. The rotor may have a multi-lobed, helically-shaped outer surface, which compliments the inner surface of the stator. The rotor may also have a rubber or elastomer disposed on its outer surface. The outer surface of the rotor has one less lobe than the inner surface of the stator such that a moving, fluid-filled chamber is formed between the rotor and the stator as fluid is pumped through the motor.

The rotor rotates and gyrates in response to a fluid (e.g., drilling fluid or mud) pumped downhole through the drill string and stator of the PDM. Below the power section, the PDM has a bearings section. The bearing section has a housing that is coupled to the stator via a cross-over housing rigidly coupled between them. A drive shaft is positioned within the bearing section housing and couples to a lower end portion of the rotor via a connecting rod. The connecting rod, which may have an upset section on each end portion thereof, translates the rotation and gyration of the rotor to the true rotation of the drive shaft. Upper and lower connections couple to the upset sections of the connecting rod to the rotor and to the drive shaft.

The bearing section contains a plurality of bearings which act to transfer the load of the drill string from the bearing section housing to the drive shaft and bit. Another function of the drilling fluid flow discussed above with respect to the bit is the use of drilling fluid to lubricate and cool the bearings. A general problem of employing drilling fluid to lubricate and cool the bearings has been erosion and wear of the bearings themselves by the fluid flow. In pumps/motors in which radial bearings serve double duty as flow restrictors, the radial bearings wear on their diameters due to side loading and thus their flow-restricting characteristics change over time. Therefore, flow restrictors are generally employed in drilling fluid lubricated/cooled bearings to restrict the bypass of fluid through the bearing section to a relatively small percentage of the total flow so as to maintain the fluid flow through the bit nozzles at a sufficient rate to effectively remove cuttings and cool the bit cutters. If the bearings or flow restrictors wear excessively, the drill string (and motor) may have to be tripped from the wellbore to enable repair of the bearings after an uneconomically short period of drilling time (e.g., when the bit is still in satisfactory condition for further drilling).

SUMMARY

Described herein are one or more implementations for a flow restrictor arranged and designed to limit bypass flow through the bearings of Moineau-type pumps and/or motors. In one implementation, an assembly to restrict fluid flow through a bearing section includes an upper ring member having an upper ring member inner surface. The upper ring member is arranged and designed to be disposed at least partially around a drive shaft and within an annulus between the drive shaft and a housing. The upper ring member also has an inner diameter permitting a radial clearance between the drive shaft and the upper ring member inner surface. The assembly also includes a lower ring member having a lower ring member inner surface. The lower ring member is arranged and designed to be disposed at least partially around the drive shaft and within the annulus between the drive shaft and the housing. The lower ring member also has an inner diameter permitting a radial clearance between the drive shaft and the lower ring member inner surface. The assembly further includes an outer ring member disposed at least partially around the drive shaft and axially between the upper and lower ring members and a floating ring member axially disposed between the upper and lower ring members. The floating ring member is disposed at least partially around the drive shaft and is radially movable and constrained inwardly of the outer ring member. The floating ring member also has a radial clearance between the drive shaft and a floating ring member inner surface with the radial clearance varying depending on the relative position of the floating ring member to the outer ring member.

The above referenced summary section is provided to introduce a selection of concepts in a simplified form that are further described below in the detailed description section. The summary is not intended to be used to limit the scope of the claimed subject matter. Furthermore, the claimed subject matter is not limited to implementations that solve disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate various implementations described herein and are not meant to limit the scope of various techniques described herein.

FIG. 2A illustrates a close-up, cross-sectional view of the flow restrictor in accordance with one or more implementations disclosed herein.

FIG. 2B illustrates a radial cross-section of the flow restrictor of FIG. 2A.

DETAILED DESCRIPTION

Figure 1:
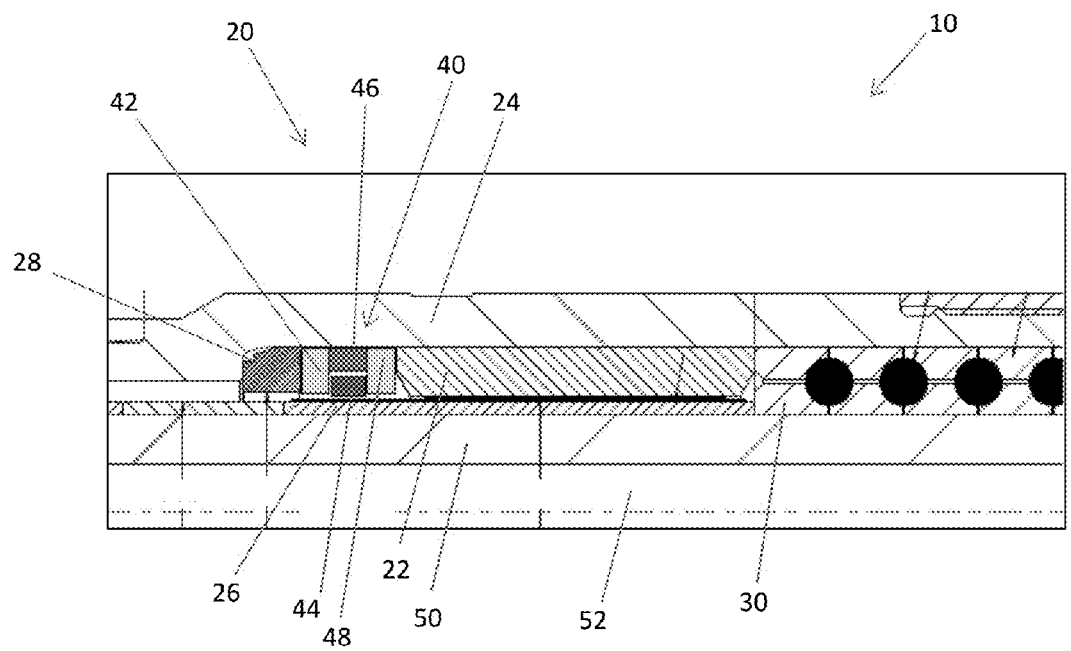
FIG. 1 illustrates a cross-sectional view of a flow restrictor within the bearing section of a motor in accordance with one or more implementations disclosed herein.

The discussion below is directed to certain specific implementations. It is to be understood that the discussion below is for the purpose of enabling a person with ordinary skill in the art to make and use any subject matter defined now or later by the patent "claims" found in any issued patent herein.

It is specifically intended that the claims not be limited to the implementations and illustrations contained herein, but include modified forms of those implementations including portions of the implementations and combinations of elements of different implementations as come within the scope of the following claims.

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, apparatuses and systems have not been described in detail so as not to obscure aspects of the implementations.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the claims. The first object and the second object are both objects, respectively, but they are not to be considered the same object.

The terminology used in the description of the present disclosure herein is for the purpose of describing particular implementations and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses one or more possible combinations of one or more of the associated listed items. It will be further understood that the terms "includes" and/or "including," when used in this specification, specify the presence of stated features, operations, elements, and/or components, but do not preclude the presence or addition of one or more other features, operations, elements, components and/or groups thereof.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells or boreholes that are deviated or horizontal, or when applied to equipment and methods that when arranged in a well or borehole are in a deviated or horizontal orientation, such terms may refer to a left to right, right to left, or other relationships as appropriate.

Various implementations will now be described in more detail with reference to FIGS. 1, 2A and 2B. In one or more implementations, a flow restrictor is disclosed, which restricts or at least maintains a constant flow (i.e., a flow that does not change over time) through the bearings of a motor, e.g., a Moineau-type, downhole mud motor. Such flow restrictor may be employed, for example, with a motor used in a downhole drive system for rotary steering tools.

FIG. 1 illustrates a cross-sectional view of a bearing section 20 of a motor 10 that has a flow restrictor 40 disposed therein. As shown in FIG. 1, the flow restrictor 40 is disposed radially between a housing 24 and an extended surface of a radial bearing 26 and axially between a spacer cap 28 and radial bearing 22/bearing stack 30. The flow restrictor 40 is arranged and designed to limit bypass flow through the bearing section 20. In one or more implementations, the flow restrictor 40 includes four rings 42, 44, 46, 48 disposed around the drive shaft 50 of the motor 10. While the four rings 42, 44, 46, 48 are shown in the Figures as being circular, those skilled in the art will recognize that any shape for members 42, 44, 46 and 48 may be employed which surrounds a drive shaft 50 and permits radial movement and/or clearance relative to the drive shaft 50. In one or more implementations, the four rings 42, 44, 46, 48 are constructed from a hard material, such as carbide. FIG. 2A illustrates a close-up, cross-sectional view of one implementation of the flow restrictor 40.

Looking to FIG. 1, floating ring member 44 is stationary relative to the drive shaft 50 and, as shown, has a very small radial clearance with an extended surface of the motor bearing assembly's upper rotating radial bearing 26. This radial clearance between floating ring member 44 and the extended surface of the upper rotating radial bearing 26 is what limits and/or controls bypass fluid flow into the bearing stack 30 of the bearing section 20. The radial clearance, however, varies at any given circumferential position (around the drive shaft 50) depending on the relative position of the floating ring member 44 to the outer ring member 46 at that circumferential position.

To prevent the floating ring member 44 from experiencing excessive side loads, which would cause it to wear, the floating ring member 44 is permitted to float radially. As shown, floating ring member 44 is permitted to float radially between the extended surface of the upper radial bearing 26 and an outer ring member 46. Thus, the floating ring member 44 is constrained radially by outer ring member 46. The floating ring member 44 is also constrained (or its axial movement limited) by an upper ring member 42 and a lower ring member 48 (uphole and downhole therefrom, respectively). The axial clearances between the upper ring member 42, the floating ring member 44 and the lower ring member 48 are designed to be very small so that the abovementioned radial clearance is the governing flow restriction. Thus, fluid is prevented or at least mitigated from flowing radially, for example, between upper ring member 42 and floating ring member 44 (and possibly axially between floating ring member 44 and outer ring member 46) because the axial gap between these members 42, 44 is arranged and designed to be small.

To prevent plugging of the flow-restricting, radial clearance by drilling fluid/mud solids or material, such as lost circulation material (LCM), it is advantageous to maintain a relative rotation between the flow-restricting, floating ring member 44 and the rotating radial bearing 26. In other words, in at least some implementations, the flow-restricting, floating ring member 44 is kept from rotating in relation to the rotating radial bearing 26 (and drive shaft 50).

As best shown in FIG. 2B (which is a cross-section of flow restrictor 40 as shown in FIG. 2A), in some implementations, two tabs or protrusions 62 are positioned to extend outwardly from the outer surface of the flow-restricting, floating ring member 44. These tabs or protrusions 62 are arranged and designed to mate or reside within slots or apertures 64 in the inner surface of the outer ring member 46. As previously described, the outer ring member 46 is trapped between the upper and lower ring members 42, 48, such that they do not rotate relative to each other. It should also be mentioned that upper ring member 42, the lower ring member 48 and the outer ring member 46 are part of a compression stack of the bearing section 20. While the tabs or protrusions 62 and mating slots or apertures 64 are designed to permit the floating ring member 44 to float in any radial direction (i.e., between the extended surface of the rotating radial bearing 26 and the outer ring member 46), the tabs or protrusions 62 and the mating slots or apertures 64 prevent rotation between the floating ring member 44 and the outer ring member 46.

As previously described, the anti-rotation tabs or protrusions 62 serve to keep the flow-restricting, floating ring member 44 from rotating along with the radial bearing 26. With relative rotation between the floating ring member 44 and the corresponding radial bearing extended surface 26 (which is clad with carbide), any LCM-type material should be ground up in the radial clearance. Material, such as LCM, could possibly plug the radial clearance between the radial bearing extended surface 26 if there was not relative rotation therebetween.

One advantage of one or more implementations of the flow restrictor 40 disclosed herein is the ability of the floating ring member 44 to float radially in any direction thereby mitigating side loads from fluid flow. Thus, while the floating ring member 44 (and thus the flow restrictor 40) will be subjected to erosive wear, it will not be subjected to abrasive wear. Such wear may then be experienced at a much slower rate than with radial bearings, which thereby extends the working life of the bearing section 20.

Although only a few example implementations have been described in detail above, those skilled in the art will readily appreciate that many modifications are possible in the example implementations without materially departing from "Flow Restrictor for a Mud Motor." Accordingly, all such modifications are intended to be included within the scope of this disclosure. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of the any of the claims herein, except for those in which the claim expressly uses the words 'means for' together with an associated function.

What is claimed is:

1. An assembly to restrict fluid flow through a bearing section, the assembly comprising:
   an upper ring member having an upper ring member inner surface, the upper ring member arranged and designed to be disposed at least partially around a drive shaft and within an annulus between the drive shaft and a housing, the upper ring member having an inner diameter permitting radial movement between the drive shaft and the upper ring member inner surface, a lower ring member having a lower ring member inner surface, the lower ring member arranged and designed to be disposed at least partially around the drive shaft and within the annulus between the drive shaft and the housing, the lower ring member having an inner diameter permitting radial movement between the drive shaft and the lower ring member inner surface, an outer ring member disposed at least partially around the drive shaft and axially between the upper and lower ring members, and a floating ring member axially disposed between the upper ring member and the lower ring member, the floating ring member disposed at least partially around the drive shaft and being radially movable and constrained inwardly of the outer ring member, the floating ring member having a radial clearance between the drive shaft and a floating ring member inner surface, the radial clearance varying depending on the relative position of the floating ring member to the outer ring member.

2. The assembly of claim 1 wherein, the floating ring member has a protrusion on an outer surface thereof that resides within a corresponding aperture within the inner surface of the outer ring member.

3. The assembly of claim 2 wherein, the floating ring member remains rotationally stationary relative to the outer ring member.

4. The assembly of claim 1 wherein, the floating ring member remains rotationally stationary relative to the outer ring member.

5. The assembly of claim 1 wherein, the drive shaft is arranged and designed to rotate relative to the floating ring member.

6. The assembly of claim 1 further comprising, a radial bearing extended surface disposed between the drive shaft and the floating ring member inner surface, the radial clearance being between radial bearing extended surface and the floating ring member inner surface.

7. The assembly of claim 6 wherein, the radial bearing extended surface is coupled to the drive shaft.

8. The assembly of claim 6 wherein, the radial bearing extended surface is coated with carbide.

9. The assembly of claim 1 wherein, the upper ring member, the lower ring member, the outer ring member and the floating ring member are constructed from carbide.

10. The assembly of claim 1 wherein, the upper ring member, the lower ring member and the outer ring member are part of a compression stack.

* * * * *